(12) United States Patent
Sharpe et al.

(10) Patent No.: US 7,071,870 B2
(45) Date of Patent: Jul. 4, 2006

(54) METHOD FOR COMBINED USE OF LOCAL POSITIONING SYSTEM AND A GLOBAL POSITIONING SYSTEM

(75) Inventors: Richard T. Sharpe, Torrance, CA (US); Frederick W. Nelson, Waukee, IA (US); Terence D. Pickett, Waukee, IA (US); Ronald R. Hatch, Wilmington, CA (US); Yunchun Yang, Harbor City, CA (US)

(73) Assignee: Navcom Technology, Inc., Torrance, CA (US)

( * ) Notice: Subject to any disclaimer, the term of this patent is extended or adjusted under 35 U.S.C. 154(b) by 0 days.

(21) Appl. No.: 11/181,410

(22) Filed: Jul. 13, 2005

(65) Prior Publication Data

US 2005/0264444 A1    Dec. 1, 2005

Related U.S. Application Data

(63) Continuation of application No. 10/757,340, filed on Jan. 13, 2004.

(51) Int. Cl.
*H04B 7/185* (2006.01)
*G01S 5/14* (2006.01)

(52) U.S. Cl. ............................ 342/357.04; 342/357.03
(58) Field of Classification Search .......... 342/357.04, 342/357.03
See application file for complete search history.

(56) References Cited

U.S. PATENT DOCUMENTS

| 5,359,332 | A | 10/1994 | Allison et al. |
| 5,935,194 | A | 8/1999 | Talbot et al. |
| 6,127,968 | A | 10/2000 | Lu |
| 6,469,663 | B1 * | 10/2002 | Whitehead et al. ..... 342/357.03 |
| 6,753,810 | B1 | 6/2004 | Yang et al. |
| 6,792,380 | B1 | 9/2004 | Toda |
| 2005/0024263 | A1 | 2/2005 | Sharpe et al. |

OTHER PUBLICATIONS

D. Lawrence et al., Integration of wide area DGPS with local area kinematic DGPS, IEEE Position Location and Navigation Symposium, p. 523-529, Apr. 1996.*

(Continued)

*Primary Examiner*—Thomas H. Tarcza
*Assistant Examiner*—Fred H. Mull
(74) *Attorney, Agent, or Firm*—Morgan, Lewis & Bockius LLP

(57) ABSTRACT

The present invention includes a method for a combined use of a local RTK system and a regional, wide-area, or global differential carrier-phase positioning system (WADGPS) in which disadvantages associated with the RTK and the WADGPS navigation techniques when used separately are avoided. The method includes determining a floating ambiguity value and a first position of an object using WADGPS in a first mode of operation, and determining a second position of the object using the local RTK system in a second mode of operation.

18 Claims, 7 Drawing Sheets

OTHER PUBLICATIONS

"Report on overseas travel", Sep. 2003, Portland, Oregon, ION 2003 Reports.doc, specifically p. 12, "bullet" item 5.

Tenny Sharpe, et al., "Exploiting the Synergies between RTK and Wide Area dGPS Systems", presentation from the Institute of Navigation, 16th International Technical Meeting, Portland, Oregon, Sep. 2003.

Bona, P., "Precision, Cross Correlation, and Time Correlation of GPS Phase and Code Observations," GPS Solutions, vol. 4, No. 2, pp. 3-13 (2000).

Hatch, R., "Instantaneous Ambiguity Resolution," presented at KIS Symposium 1990, Banff, Canada, Sep. 11, 1990.

Hatch, R., "The Synergism of GPS Code and Carrier Measurements," Magnavox Government and Industrial Electronics Company, Jan. 1982.

Hwang, P.Y.C., "Kinematic GPS for Differential Positioning: Resolving Integer Ambiguities on the Fly," NAVIGATION: Journal of the Institute of Navigation, vol. 38, No. 1, pp. 1-15, Spring 1991.

Search Report for International Patent Application No. PCT/US2005/042374, International Filing Date Dec. 15, 2004.

Walsh, D., "Real Time Ambiguity Resolution While on the Move," Proceedings of the Institute of Navigation GPS-92, Washington, DC, Sep. 18, 1992, pp. 473-481.

Yang, Y., "Tightly Integrated Attitude Determination Methods for Low-Cost Inertial Navigation: Two-Antenna GPS and GPS/Magnetometer," Dissertation submitted to University of California, Riverside, Jun. 2001.

* cited by examiner

METHOD FOR COMBINED USE OF LOCAL POSITIONING SYSTEM AND A GLOBAL POSITIONING SYSTEM

CROSS REFERENCE TO RELATED CASE

This application is a continuation of U.S. patent application Ser. No. 10/757,340, filed on Jan. 13, 2004, the contents of which are herein incorporated by reference.

TECHNICAL FIELD

The present invention relates generally to technologies associated with positioning and navigation using satellites, and more particularly to resolving carrier floating ambiguity in a regional, wide-area, or global carrier-phase positioning and/or navigation system.

BACKGROUND OF THE INVENTION

The global positioning system (GPS) uses satellites in space to locate objects on earth. With GPS, signals from the satellites arrive at a GPS receiver and are used to determine the position of the GPS receiver. Currently, two types of GPS measurements corresponding to each correlator channel with a locked GPS satellite signal are available for civilian GPS receivers. The two types of GPS measurements are pseudorange, and integrated carrier phase for two carrier signals, L1 and L2, with frequencies of 1.5754 GHz and 1.2276 GHz, or wavelengths of 0.1903 m and 0.2442 m, respectively. The pseudorange measurement (or code measurement) is a basic GPS observable that all types of GPS receivers can make. It utilizes the C/A or P codes modulated onto the carrier signals. The measurement records the apparent time taken for the relevant code to travel from the satellite to the receiver, i.e., the time the signal arrives at the receiver according to the receiver clock minus the time the signal left the satellite according to the satellite clock. The carrier phase measurement is obtained by integrating a reconstructed carrier of the signal as it arrives at the receiver. Thus, the carrier phase measurement is also a measure of a transit time difference as determined by the time the signal left the satellite according to the satellite clock and the time it arrives at the receiver according to the receiver clock. However, because an initial number of whole cycles in transit between the satellite and the receiver when the receiver starts tracking the carrier phase of the signal is usually not known, the transit time difference may be in error by multiple carrier cycles, i.e., there is a whole-cycle ambiguity in the carrier phase measurement.

With the GPS measurements available, the range or distance between a GPS receiver and each of a multitude of satellites is calculated by multiplying a signal's travel time by the speed of light. These ranges are usually referred to as pseudoranges (false ranges) because the receiver clock generally has a significant time error which causes a common bias in the measured range. This common bias from receiver clock error is solved for along with the position coordinates of the receiver as part of the normal navigation computation. Various other factors can also lead to errors or noise in the calculated range, including ephemeris error, satellite clock timing error, atmospheric effects, receiver noise and multipath error. With standalone GPS navigation, where a user with a GPS receiver obtains code and/or carrier-phase ranges with respect to a plurality of satellites in view, without consulting with any reference station, the user is very limited in ways to reduce the errors or noises in the ranges.

To eliminate or reduce these errors, differential operations are typically used in GPS applications. Differential GPS (DGPS) operations typically involve a base reference GPS receiver, a user (or navigation) GPS receiver, and a communication link between the user and reference receivers. The reference receiver is placed at a known location and the known position is used to generate corrections associated with some or all of the above error factors. The corrections are supplied to the user receiver and the user receiver then uses the corrections to appropriately correct its computed position. The corrections can be in the form of corrections to the reference receiver position determined at the reference site or in the form of corrections to the specific GPS satellite clock and/or orbit. Differential operations using carrier-phase measurements are often referred to as real-time kinematic (RTK) positioning/navigation operations.

The fundamental concept of Differential GPS (DGPS) is to take advantage of the spatial and temporal correlations of the errors inherent in the GPS measurements to cancel the noise factors in the pseudorange and/or carrier phase measurements resulting from these error factors. However, while the GPS satellite clock timing error, which appears as a bias on the pseudorange or carrier phase measurement, is perfectly correlated between the reference receiver and the user receiver, most of the other error factors are either not correlated or the correlation diminishes in wide-area applications, i.e., when the distance between the reference and user receivers becomes large.

To overcome the inaccuracy of the DGPS system in wide-area applications, various regional, wide-area, or global DGPS (hereafter referred to as wide-area DGPS or WADGPS) techniques have been developed. The WADGPS includes a network of multiple reference stations in communication with a computational center or hub. Error corrections are computed at the hub based upon the known locations of the reference stations and the measurements taken by them. The computed error corrections are then transmitted to users via communication link such as satellite, phone, or radio. By using multiple reference stations, WADGPS provides more accurate estimates of the error corrections.

Thus, a number of different techniques have been developed to obtain high-accuracy differential navigation using the GPS carrier-phase measurements. The technique with the highest accuracy is the RTK technique, which has a typical accuracy of about one-centimeter. In order to obtain that accuracy, however, the whole-cycle ambiguity in the differential carrier-phase measurements must be determined. When the distance between the user receiver and the reference receiver (baseline distance) is short, the RTK technique is highly advantageous because in this case, the whole-cycle ambiguity can be resolved not only accurately but also quickly. On the other hand, when the baseline distance is more than a few tens of kilometers, it may become impossible to determine the whole-cycle ambiguity and the normal RTK accuracy cannot be achieved. Another limitation of the RTK technique is that it requires a local radio link to be maintained between the reference receiver and the navigation receiver.

The WADGPS techniques that employ a carrier-phase differential method can also achieve very high navigation accuracy. The WADGPS differential techniques are also characterized by reliable long distance low-frequency communication links or by reliable satellite communication links. Thus, corrections can generally be communicated to navigation receivers without significant interruption. However, the WADGPS techniques usually treat the whole-cycle ambiguities as a real-valued (non-integer) variable and solve for a "floating ambiguity," which is usually very poorly defined until measurement data covering a time interval of significant satellite geometry change have been obtained. Thus, in a WADGPS application, a time interval as long as one or two hours is often required to solve for the "floating ambiguity" in order to yield an accuracy of less than 10 centimeters in the navigated position.

SUMMARY OF THE INVENTION

The present application includes a method for combining the use of the RTK and the WADGPS navigation techniques so that the weaknesses of each technique can be complemented by the strengths of the other technique. The primary disadvantage of the WADGPS technique is that the navigation receiver takes a long elapsed time (often more than an hour) to determine the floating ambiguity values, which are required to convert the carrier-phase measurements into accurate range measurements. The primary disadvantages of the RTK technique are that it requires a real-time (normally line of site) data link between a user GPS receiver and a reference GPS receiver and that the whole-cycle ambiguity can only be determined when the separation distance between reference GPS receiver and user GPS receiver is relatively short.

These separate disadvantages can be removed by using the method for combining the use of the RTK and the WADGPS navigation techniques according to one embodiment of the present invention. The method includes using a known position of a user receiver to initialize the floating ambiguity values in a WADGPS system. When the user receiver has been stationary, the known position of the user receiver may be a surveyed position or a position obtained from a prior operation. When the user receiver is moving, the known location may be obtained using an RTK system.

Thus, in a combined operation, when the communication link for the RTK navigation is available, the position, velocity and time (PVT) outputs of the user receiver can be obtained using the RTK system, while the WADGPS system runs in the background and its outputs are constantly initialized to agree with the outputs from the RTK system. When the communication link for the RTK navigation is lost, or when the user receiver wanders too far away from the reference station in the RTK system, the PVT outputs of the user receiver can be obtained using the WADGPS system, which has been initialized while the RTK was operating. The initialization avoids the normal 15 minute to two hour "pull-in" time required to solve for the floating ambiguity values when the position of the user GPS receiver is not known. This provides very accurate PVT solutions from the WADGPS system while the RTK system is unavailable or inaccurate, and makes the WADGPS technique more practical for real-time high-accuracy positioning and navigation purposes.

DESCRIPTION OF THE INVENTION

Figure 1:
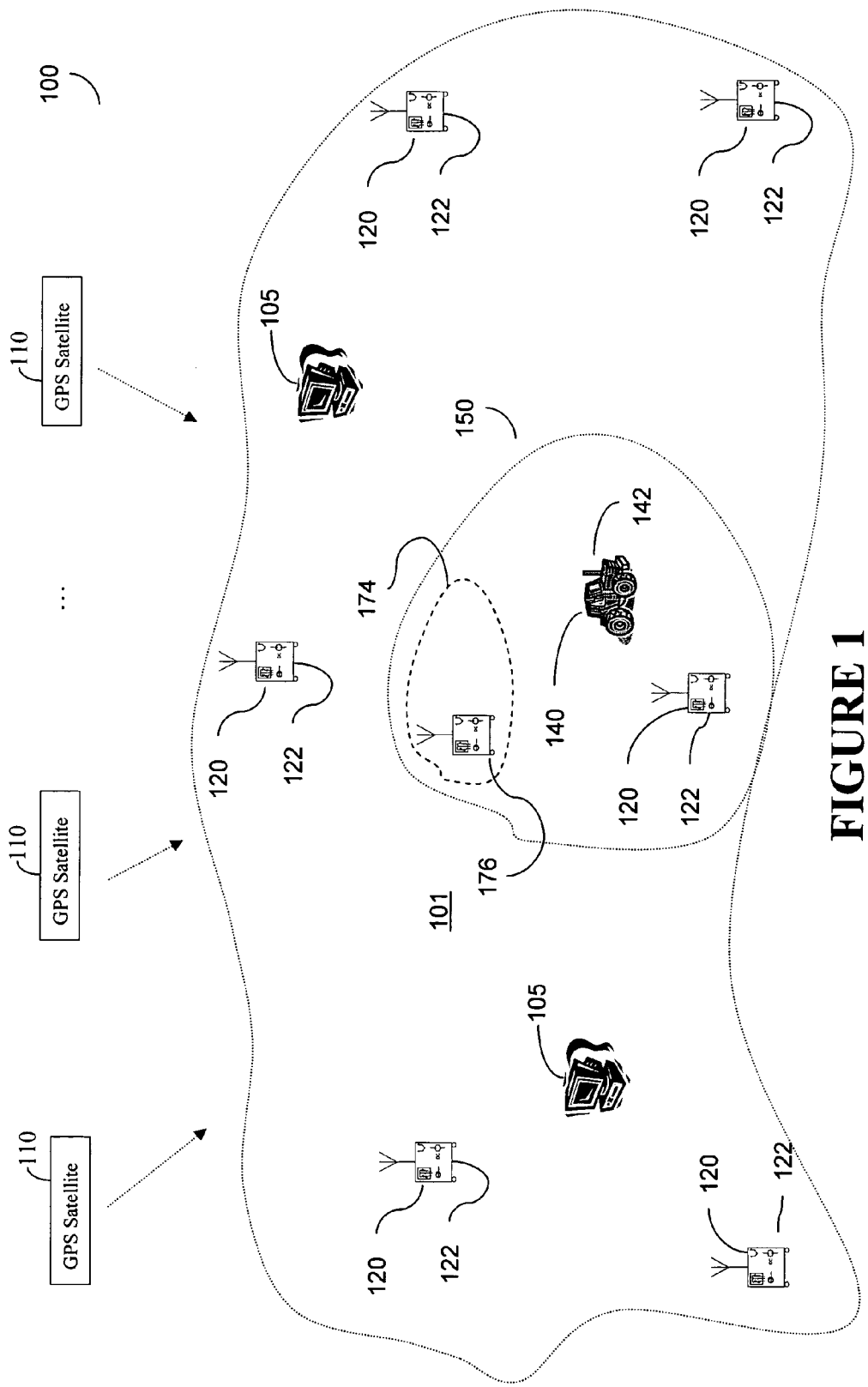
FIG. 1 is a block diagram of a combination of a WADGPS system and a local RTK system according to one embodiment of the present invention.

FIG. 1 illustrates a wide-area or global differential GPS (WADGPS) system 100 according to one embodiment of the present invention. As shown in FIG. 1, the WADGPS system 100 includes a network of reference stations 120 each having a GPS receiver 122, and one or more processing hubs 105. The reference stations 120 continuously provide raw GPS observables to the hub 105 for processing. These observables include GPS code and carrier phase measurements, ephemerides, and other information obtained according to signals received from a plurality of satellites 110 at the reference stations 120. The reference stations 120 are placed at known locations across a wide area 101, such as a continent, for a wide-area DGPS system, or across the globe for a global DGPS network. The hubs 105 are facilities at which the GPS observables are processed and DGPS corrections are computed. If multiple independent hubs are provided, it is preferred that they are geographically separated and operate in parallel.

The WADGPS system 100 may be utilized by one or more users (or user devices or objects) 140 each having a user GPS receiver 142 for positioning and/or navigation purposes. In one embodiment of the present invention, the user 140 is associated with a nearby reference station 120 through a RTK radio link such that the user receiver 142 and the nearby reference station 120 forms a local RTK system 150. System 100 further includes conventional data links (not shown) for providing reliable transport mechanisms for the GPS observables to be sent from the reference stations 120 to the hubs 105 and for the computed corrections to be broadcast from the hubs 105 to the reference stations 120 and the users 140. A continental WADGPS system usually has about 3 to 10 reference receivers and a global WADGPS system usually has about 20 to 100 reference receivers feeding data to the hubs 105. In one embodiment of the present invention, the GPS observables are sent from the reference stations 120 to the hubs 105 via the Internet, and computed corrections are sent also via the Internet from the hubs to one or more land stations (not shown) to be uplinked to one more satellites (not shown), which then broadcast the computed corrections for receipt by the reference stations 120 and the user receiver 142.

Figure 2:
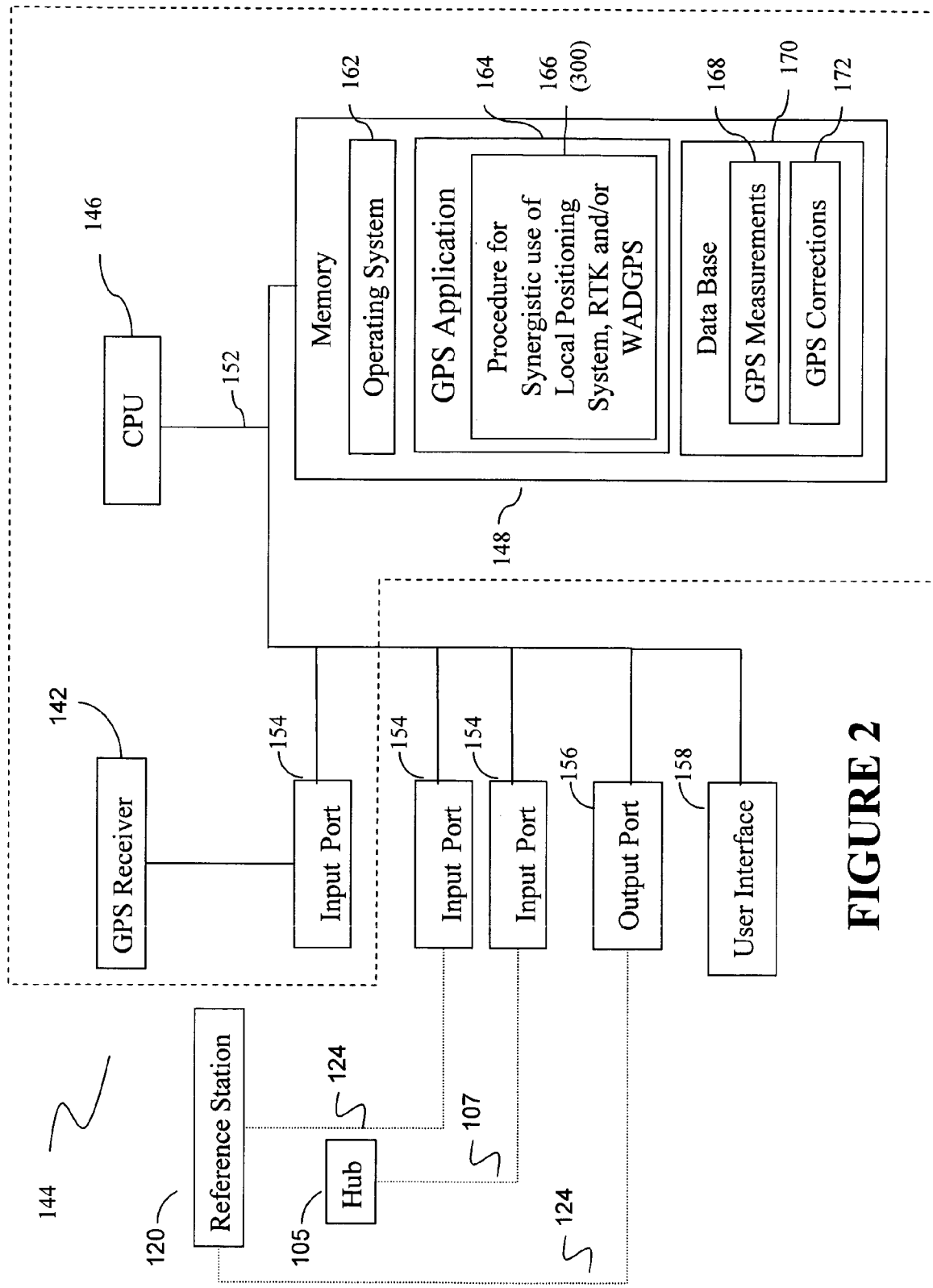
FIG. 2 is a block diagram of a computer system coupled to a user GPS receiver.

In one embodiment of the present invention, the user or object 140 is also equipped with a computer system 144 coupled to the user GPS receiver 142. As shown in FIG. 2, computer system 144 includes a central processing unit (CPU) 146, memory 148, one or more input ports 154, one or more output ports 156, and (optionally) a user interface 158, coupled to each other by one or more communication buses 152. The memory 148 may include high-speed random access memory and may include nonvolatile mass storage, such as one or more magnetic disk storage devices or flash memory devices.

The memory 148 preferably stores an operating system 162, GPS application procedures 164, and a database 170. The GPS application procedures 164 may include procedures 166 for carrying out a method 300 for combining the use of the local RTK system 150 and the WADGPS system 160, as described in more detail below. The operating system 162 and application programs and procedures 164 stored in memory 148 are for execution by the CPU 146 of the computer system 144. The memory 148 preferably also stores data structures used during execution of the GPS application procedures 164, including GPS pseudorange and carrier-phase measurements 168, GPS corrections 172 received from the hubs, as well as other data structures discussed in this document.

The input ports 154 are for receiving data from the GPS receiver 142, for receiving information from the reference station 120 in the local RTK system 120 via a radio link 124, and for receiving GPS corrections and other information from the hubs 105 via a satellite link 107. The output port 156 is used for outputting data to the reference station 120 via the radio link 124. In one embodiment of the present invention, the CPU 146 and the memory 148 of the computer system 144 are integrated with the GPS receiver 142 into a single device, within a single housing, as shown in FIG. 2. However, such integration is not required to carry out the methods of the present invention.

Therefore, the user or object 140 may engage in two different modes of operation either simultaneously or at different times. The user or object 140 may operate in a WADGPS mode in which the user or object 140 positions itself or navigates using the WADGPS system 100, and/or in a RTK mode in which the user or object 140 positions itself or navigates using the local RTK system 150. When the user or object 140 is close to the reference station 120 with which it is associated and the radio link between the user or object 140 and the reference station 120 can be maintained, the user can use the local RTK system 150 to position itself with respect to the reference station 120. The local RTK system 150 is more advantageous than the WADGPS system 100 in that it is more accurate and that the whole-cycle integer ambiguity can be quickly resolved, as explained in the following.

Using the local RTK system 150, when measurements are taken with respect to n satellites 110 in view of the reference GPS receiver 122 and the associated user GPS receiver 142, the measurements can be used to solve for the position of the user or object 140 according to the following equation in array format:

$$(\nabla\Phi+N)\lambda=Hx+n_\phi \qquad (1)$$

where $\nabla\Phi=[\nabla\phi_1 \ \nabla\phi_2 \ \ldots \ \nabla\phi_n]^T$ is a carrier phase measurement vector formed by the differential carrier phase measurement with respect to each of the n satellites 110, $N=[N_1 \ N_2 \ \ldots \ N_n]^T$ is an integer ambiguity vector formed by the differential integer ambiguity associated with each of the differential carrier phase measurements in the carrier phase measurement vector, $H=[h_1 \ h_2 \ \ldots \ h_n]^T$ is a measurement sensitivity matrix formed by the unit vectors from the user or object 140 to the n satellites 110, x is a real unknown state vector (or real vector) including a position vector from the reference station 120 to the user or object 140 in the local RTK system 150, and $n_\phi=[n_{\phi_1} \ n_{\phi_2} \ \ldots \ n_{\phi_n}]^T$ is a measurement noise vector (or phase range residual vector) formed by the differential carrier phase noise with respect to each of the n satellites 110.

To solve for the real vector x using Equation (1), the integer ambiguity vector N needs to be resolved. Many different methods have been developed to resolve the integer ambiguity values included in the integer ambiguity vector N and these methods typically use a search process to find a combination of integer ambiguity values that satisfy certain criteria, such as a minimum norm of a measurement residual vector $\Delta_\Phi$, $$\Delta_\Phi=(\nabla\Phi+\tilde{N})\lambda-H\hat{x} \qquad (2)$$

where $\Delta_\Phi$ is a phase range residual vector corresponding to a candidate integer ambiguity vector $\tilde{N}$ including the combination of integer ambiguity values, and $\hat{x}$ is a least squares solution of Equation (1), $$\hat{x} = [H^T H]^{-1} H^T (\nabla\Phi + N)\lambda \qquad (3)$$

or, $$\hat{x} = [H^T RH]^{-1} H^T R^{-1} (\nabla\Phi + N)\lambda \qquad (4)$$

where $$R = \begin{bmatrix} \sigma_1^2 & \cdots & 0 \\ \vdots & \ddots & \vdots \\ 0 & & \sigma_n^2 \end{bmatrix} \qquad (5)$$

is a measurement covariance matrix formed by $\sigma_i$, which is a standard deviation of the differential carrier phase noise $n_{\phi_i}$ calculated using conventional methods. An example of the methods for calculating $\sigma_i$ can be found in "*Precision, Cross Correlation, and Time Correlation of GPS Phase and Code Observations*," by Peter Bona, GPS Solutions, Vol. 4, No. 2, Fall 2000, p. 3–13, or in "*Tightly Integrated Attitude Determination Methods for Low-Cost Inertial Navigation: Two-Antenna GPS and GPS/Magnetometer*," by Yang, Y., Ph.D. Dissertation, Dept. of Electrical Engineering, University of California, Riverside, Calif. June 2001, both hereby incorporated by reference.

Other examples of the search methods can be found in "Instantaneous Ambiguity Resolution," by Hatch, R., in the Proceedings of the KIS Symposium 1990, Banff, Canada, which is incorporated herein by reference, and in commonly owned patent application for "Fast Ambiguity Resolution for Real Time Kinematic Survey and Navigation," patent application Ser. No. 10/338,264, which is also incorporated herein by reference.

With the integer ambiguity resolved, the position, velocity and time (PVT) of the user receiver 142 can be accurately computed as solutions of the local RTK system 150.

In spite of its many advantages, the local RTK system 150 may not be available to the user or object 140 at all times because the user may move to a location that is too far from the reference station 120 or is out of site of the reference station 120 so that the radio link 124 between the user or object 140 and the reference station cannot be maintained. In these situations, ionospheric induced error cannot be satisfactorily removed by taking into account the difference between measurements at the user or object 140 and at the reference station 120. This error affects the above search process for the integer ambiguity vector because it causes measurement residuals included in the measurement residual vector $\Delta_\Phi$ to increase.

Therefore, in situations where the local RTK system 150 is not available or has lost its accuracy due to a large separation between the user GPS receiver and the reference station, the user may need to operate in the WADGPS mode in which a different approach to resolving integer ambiguity is used. Using the WADGPS system 100, each whole-cycle ambiguity is estimated as a real-valued (non-integer) variable. This practice is often referred to as determining a "floating ambiguity" value. One method for determining the "floating ambiguity" value involves the formation of refraction corrected code and carrier-phase measurements based on raw GPS measurements taken at the user or object 140, the scaling of the carrier-phase measurements to the same units as the code measurements, and the subtraction of each scaled carrier-phase measurement from the corresponding code measurement to obtain an offset value. In one embodiment of the present invention, the refraction-corrected code measurement, designated as $P_{RC}$, is formed as follows:

$$P_{RC} = \frac{f_1^2}{(f_1^2 - f_2^2)} P_1 - \frac{f_2^2}{(f_1^2 - f_2^2)} P_2 \cong P_1 - 1.5457(P_1 - P_2). \tag{6}$$

where $P_1$ and $P_2$ are the raw pseudorange code measurements on the L1 and L2 frequencies $f_1$ and $f_2$, respectively, at a particular measurement epoch. The refraction-corrected carrier-phase measurement, designated as $L_{RC}$, is formed similarly as follows:

$$L_{RC} = \frac{f_1^2}{(f_1^2 - f_2^2)} L_1 - \frac{f_2^2}{(f_1^2 - f_2^2)} L_2 \cong L_1 - 1.5457(L_1 - L_2), \tag{7}$$

where $L_1$ and $L_2$ are the carrier-phase measurements scaled by the wavelengths of the L1 and L2 signals, respectively, and each includes an approximate whole-cycle ambiguity value that has been added to cause the scaled carrier-phase measurement to be close to the same value as the corresponding code measurement. Thus, $$L_1 = (\phi_1 + N_1)\lambda_1, \tag{8}$$

$$L_2 = (\phi_2 + N_2)\lambda_2, \tag{9}$$

where $\phi_1$ and $\phi_2$ are the raw carrier phase measurement on the L1 and L2 frequencies, respectively, at the same measurement epoch, and the whole-cycle values of $N_1$ and $N_2$ have been initialized at the start of carrier-phase tracking by the user or object 140 to give values that are within one carrier wavelength of the corresponding code measurements so as to keep the differences between the scaled carrier-phase measurements and the corresponding code measurements small. From the form of equation (7), it is noted that the refraction corrected carrier-phase measurement includes a whole-cycle ambiguity with a wavelength $\lambda$ determined by the sum of $f_1$ and $f_2$ (which is about 2.803 GHz), so that $\lambda$ is approximately 0.1070 meters (i.e., $c/(f_1+f_2)$).

Because the ionospheric effects have been removed from both the code and carrier-phase measurements according to Equations (6)–(9) and the effects of satellite clock and orbit errors on the pseudorange and carrier-phase measurements are the same, the values of $P_{RC}$ and $L_{RC}$ obtained in step 310 should be almost identical except for the possible whole-cycle ambiguity associated with the carrier-phase measurement $L_{RC}$ and the higher multipath noise in the code measurement $P_{RC}$. This allows the resolution of the whole-cycle ambiguity in $L_{RC}$ by smoothing an offset ($O = P_{RC} - L_{RC}$) between the refraction corrected code measurement and the refraction corrected carrier-phase measurement across a series of measurement epochs so that the offset becomes an increasingly accurate estimate of the "floating ambiguity." The smoothed offset value can be further adjusted by using post-fix measurement residuals to provide an additional carrier-phase measurement adjustment such that the adjusted measurement residuals are near zero.

In one embodiment of the present invention, the offset is smoothed by taking an expanding average of the offset as follows:

$$O_i = O_{i-1} + (P_{RC}^i - L_{RC}^i - O_{i-1})/\eta, \tag{10}$$

where i=1, 2, 3, . . . , is used to designate a measurement epoch, and the value of $\eta$ is a confidence value that increases as $O_i$ becomes a more accurate estimate of the floating ambiguity value. In one embodiment of the present invention, $\eta$ is equal to i until a maximum value of averaging is attained. For example, if the carrier-phase measurement is assumed to have only $\frac{1}{100}^{th}$ of the noise of the code measurement, the value of "$\eta$" would be limited to be less than 100 squared or 10,000. Equation (9) can thus be recursively computed until a predetermined accuracy of the floating ambiguity value is reached.

With the smoothed offset $O_i$, a smoothed refraction-corrected code measurement, S, can be obtained by adding the refraction corrected carrier-phase measurement for the current measurement epoch to the smoothed offset, so that $$S_i = O_i + L_i \tag{11}$$

which has the accuracy of the carrier-phase measurement but without the associated ambiguities.

The above process as described in association with Equations (6)–(11) is performed for each of a plurality of satellites in view of the user GPS receiver 142. With the smoothed refraction-corrected code measurement available for each of the plurality of satellites in view of the user GPS receiver 142, the pseudoranges to these satellites can be obtained. These peudoranges are adjusted with the WADGPS corrections received from the hubs 105 and are used in a weighted least squares fix to calculate the state vector x. This way, the position, velocity and time (PVT) of the user GPS receiver 142 can be computed as WADGPS solutions for the PVT of the user GPS receiver 142.

Other examples of the methods to obtained the smoothed, refraction corrected offsets can be found in "The Synergism of Code and Carrier Measurements," by Hatch, R. in the Proceedings of the Third International Geodetic Symposium on Satellite Doppler Positioning, DMA, NOS, Las Cruces, N.M., New Mexico State University, Vol. 11, pp. 1213–1232, which is incorporated herein by reference, and in commonly owned patent application for a "Method for Generating Clock Corrections for a Wide-Area or Global Differential GPS System," U.S. patent application Ser. No. 10/630,302, which is also incorporated herein by reference.

It is also possible to solve for the "floating ambiguity" values as separate states in a least-squares or Kalman filter solution. When the ambiguities are included as states, an estimate value for each floating ambiguity value is adjusted according to a variance so that it becomes increasingly accurate as the geometry of the system changes due to satellite motion. Thus, this technique also yields an increasingly accurate estimate over time. See Patrick H. C. Hwang's paper in *Navigation* Vol. 38, No. 1, Spring 1991, titled "Kinematic GPS for Differential Positioning: Resolving Integer Ambiguities on the Fly," which is incorporated herein by reference.

There are many combinations and variations of the above techniques which can be used to estimate the "floating ambiguity" values. However, all of them involve processing data over a significant time interval. The time interval can often be as long as one or two hours before one can be confident that the "floating ambiguity" is accurate enough to yield an accuracy of less than 10 centimeters in the navigated position of the user 140. To shorten the time interval for obtaining the "floating ambiguity" values, the WADGPS system can be initialized as described below using a know location of the user GPS receiver 142.

Figure 3A:
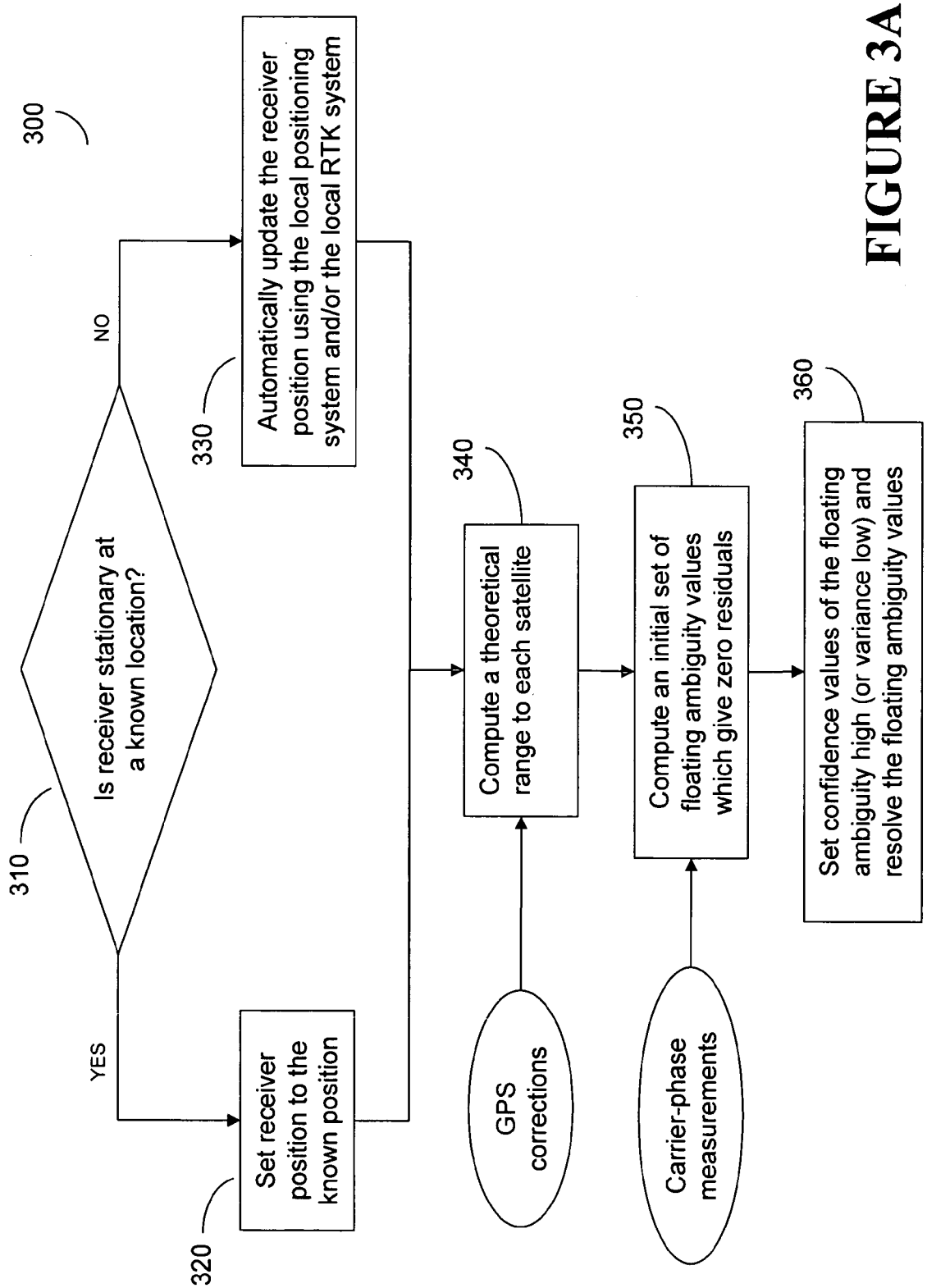
FIG. 3A is a flowchart illustrating a method for combining the use of the WADGPS system and the local RTK system.

FIG. 3A illustrates a method 300 for initializing the WADGPS system 100. As shown in FIG. 3, method 300 includes a step 310 in which it is determined whether the user is stationary at a known location. This can be done according to user input or via some conventional mechanism that allows the computer 144 to determine whether the user receiver 142 has been stationary. If the position of the user receiver 142 is accurately known, that position can be used to compute the floating ambiguity values without the assistance of the local RTK system 150, as explained in more detail below. A surveyed position of the user GPS receiver 142 could be used as the known position, or in some environments, the position may be known simply because the user or object 140 has been stationary and the user position has already been determined during a prior operation.

In response to the determination that the user is stationary at a known location, method 300 proceeds to a step 320 in which the user receiver position is set to the known location. Otherwise, method 300 proceeds to a step 330 in which the local RTK system 150 is enabled to automatically update the user location using the method discussed above.

Method 300 further includes a step 340 in which the user receiver location, whether it is determined in step 320 or step 330, is used to compute a set of theoretical ranges to the satellites 110. This may involve computing the positions of the satellites 110 based on the broadcast ephemeredes from the WADGPS system 100 and adjusting those positions by the orbital corrections broadcast by the WADGPS system 100. Given both the user receiver position and the satellite positions in Cartesian coordinates, the theoretical range from the user 140 to each satellite 110 can be computed as follows:

$$r = \sqrt{(x_s - x_u)^2 + (y_s - y_u)^2 + (z_s - z_u)^2} \quad (11)$$

where subscript s designates the satellite coordinate and subscript u designates the user or object receiver coordinate.

Method 300 further includes a step 350 in which the initial floating ambiguity value, a, corresponding to each satellite is calculated by subtracting from the computed theoretical range the range obtained from the refraction-corrected carrier-phase measurement with respect to the same satellite so that, $$a = r - L^0_{RC} \quad (12)$$

where $L^0_{RC}$ represents the refraction-corrected carrier-phase measurement computed according to Equation (7) at a beginning measurement epoch.

Method 300 further includes a step 360 in which the floating ambiguity values are resolved by adding the initial floating ambiguity values to the corresponding refraction-corrected carrier-phase measurements in subsequent measurement epochs, i.e., $$L^i_{RC} = L^i_{RC} + a,$$

and by treating the floating ambiguity values as well known so that the confidence is set to high (or the variance is set to low). In practice, step 360 is accomplished by using a small value of gain to adjust the floating ambiguity values in a process for determining the floating ambiguity values. For example, if the floating ambiguity values are determined by smoothing the offset between the refraction-corrected code measurement and the refraction-corrected carrier-phase measurement according to Equation (9), a small gain means treating the floating ambiguity value as if a large number of offset values have been used in computing it, so that $\eta = i + (a$ large number). If the ambiguity value is determined in a Kalman filter process, a small gain is achieved by setting the variance of the ambiguity state to a small value.

Thus, by using the known location of a stationary user receiver 142, or by using the local RTK system 150 to initialize the floating ambiguity values, a normal fifteen minute to two hours of "pull-in" time required to solve for the floating ambiguity values when the user receiver position is not known is avoided. This can greatly speed up the process for resolving carrier-phase ambiguities in the WADGPS system 100, making the WADGPS system 100 more suitable for real-time positioning and/or navigation purposes.

In order to use the local RTK system 150 to update the user receiver position in the method 300, the position of the reference station 120 in the local RTK system 150 must be determined accurately in the WADGPS system 100. A conventional RTK system can be used in a relative sense, meaning that the position of the user receiver 142 can be determined relative to the reference receiver. This way, accurate relative positions of the user GPS receiver 142 can be obtained even though the coordinates of the reference station are not particularly accurate and coordinate data other than the normal GPS data are used to position the reference station. For the combined use of the local RTK system 150 and the WADGPS system 100, however, an absolute position of the reference receiver 120 in the RTK system 150 needs to be determined. If an incorrect position is used for the reference station 120 in the local RTK system 150, it will cause the floating ambiguity values computed as described above to be incorrect. This will lead to a slow drift of the computed position of the user receiver 142 as the floating ambiguity values are slowly adjusted to the correct value during subsequent WADGPS processing.

In one embodiment of the present invention, a mean position of the reference station 120 in the RTK system 150 is determined based on hours of positioning data from the WADGPS system 100 for increased reliability. In an alternative embodiment, a computer system at the reference station 120 accepts an operator input value for its position and provides the position to the user 140. This allows the relative RTK positioning to commence immediately using that reference position. At the same time, a more accurate position of the reference station 120 is determined by the WADGPS system 100 and is transmitted to the reference station 120. This more accurate position or an offset between the operator input position and the more accurate position of the reference station 120 determined by the WADGPS system 100 is then transmitted at a relatively low rate to the user 140.

Figure 3B:
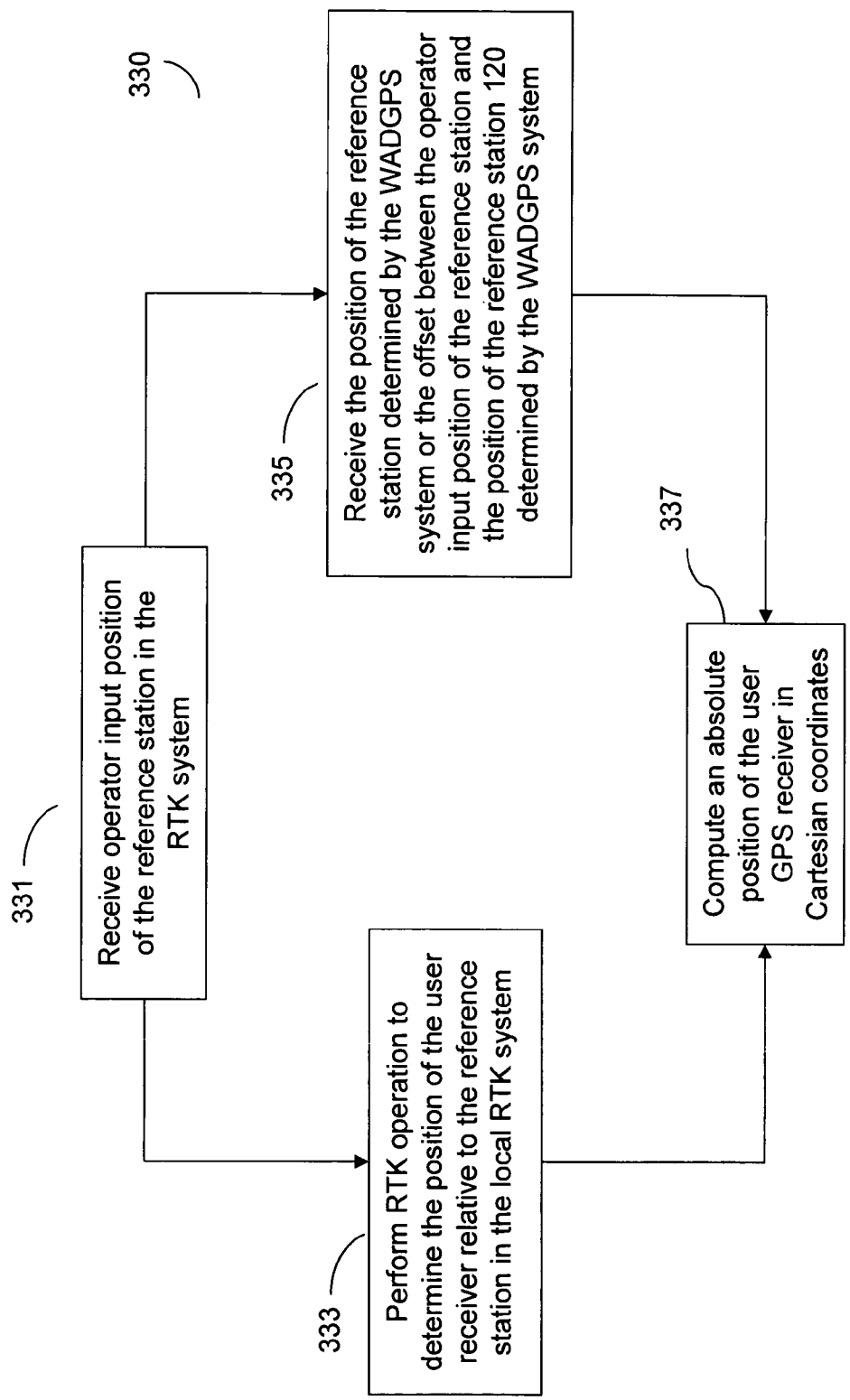
FIG. 3B is a flowchart illustrating a method for updating a receiver position using a local RTK system.

FIG. 3B illustrates in more detail step 330 in the method 300 in which the user position is updated using the local RTK system 150. As shown in FIG. 3B, step 330 includes a substep 331 in which the user or object 140 receives the operator input position of the reference station 120 in the RTK system 150, and a substep 333 in which the user or object 140 performs local RTK operation to determine its own position relative to that of the reference station 120. Step 330 further includes a substep 335 in which the user or object 140 receives the more accurate position of the reference station 120 determined by the WADGPS system 100 or the offset between the operator input position of the reference station 120 and the more accurate position of the reference station 120 determined by the WADGPS system 100. Step 330 further includes a substep 337 in which the user or object 140 computes an absolute position of the user GPS receiver 142 in Cartesian coordinates using either the user input position of the reference station or the position of the reference station 120 determined by the WADGPS system 100 (if available).

An example where benefits could be obtained by using the method 300 is in positioning a train. When a train passes through a tunnel, both the local RTK link and the global WADGPS link would be lost. In this situation the RTK data link can be set up to initialize the WADGPS floating ambiguity values as the train comes out of the tunnel. This would avoid the long data interval otherwise required to determine the correct floating ambiguity values.

Another example where benefits could be obtained by using the method 300 is in positioning an airplane right after take-off. In this case, a local RTK system at an airport where a plane is preparing to take off can be used to initialize the WADGPS ambiguities either before or during the take-off.

Thus, the user or object 140, which includes the user GPS receiver 142 and the computer system 144 coupled to the user GPS receiver 142, can operate in both the RTK mode and the WADGPS mode. The local RTK system 150 is more favorable than the WADGPS system because the search process for the local RTK system 150 as discussed above takes much less time than the smoothing method in the WADGPS system 100 for resolving the integer ambiguity values. In the search process, the smoothing of the code measurements is either not required or a smoothing of the code measurements of much shorter duration is performed, not to determine the whole-cycle ambiguity directly, but to provide a decreased uncertainty in an initial set of integer ambiguity values so that the subsequent search process can be more tightly constrained. For that reason, only a few seconds of data is sufficient for obtaining the initial set of ambiguity values. The local RTK system 150, however, is only available in situations where the communication link between the user GPS receiver 142 and the reference station 120 in the local RTK system 150 can be maintained and the user or object 140 does not wander too far from the reference station 120 in the local RTK system 150. When these conditions are not satisfied, that is, when the local RTK system 150 is either not available or inaccurate, the user can resort to the WADGPS system 100 for navigation by using the user receiver position last determined by the RTK system 150 to initialize the WADGPS system so that the long "pull-in" time to obtain the "floating ambiguity" values is avoided.

Figure 4:
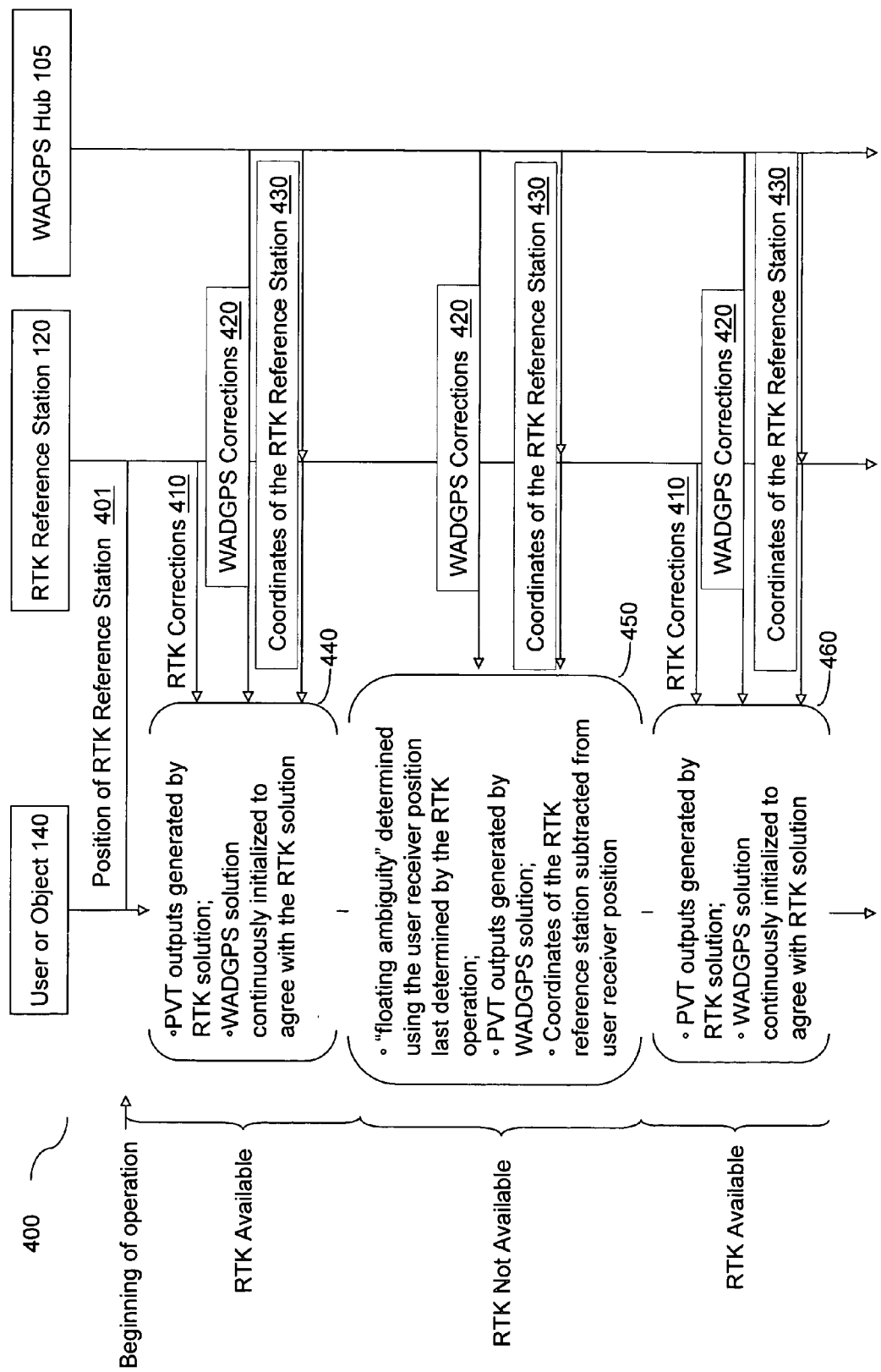
FIG. 4 is a flowchart illustrating a process flow for combined operation using both the WADGPS system and the local RTK system.

FIG. 4 illustrates a process flow 400 for a combined RTK and WADGPS operation performed by the user computer system 144. The process flow includes steps 440, 450 and 460. As shown in FIG. 4, while the RTK corrections are available, the user 140 operates in the RTK mode. It receives the position 401 of the reference station 120 in the local RTK system 150 and performs step 440 in which the user receiver's PVT are determined using the RTK corrections 410 received from the reference receiver 120 in the local RTK system 150. During the performance of step 440, the user 140 may continue to receive the WADGPS corrections 420 from the hubs 105 so that WADGPS solutions can be generated in the background. The user 140 may also receive updated position 430 of the reference station 120 in the local RTK system 150 from the hub 105 at a relatively low rate.

Using the updated position of the reference station 120 and the RTK solution of the user receiver position, the WADGPS solutions can be continuously initialized in the background to agree with the RTK solutions, according to the method 300 discussed above.

When the RTK corrections are lost, the user 140 switches to the WADGPS mode of operation and performs step 450, in which the user 140 uses the user receiver position determined in the RTK mode of operation immediately before the RTK corrections became unavailable to initialize the floating ambiguity values for the WADGPS mode of operation according to the method 300 discussed above. This way, the "floating ambiguity" values can be determined without the long "pull-in" time. During the performance of step 450, the user 140 continues to receive the WADGPS corrections 420 from the hubs 105. The user 140 may also receive the updated position 430 of the reference station 120 in the local RTK system 150 from the hub 105 at a relatively low rate. The reference station coordinates are used to transform the user receiver position generated in the WADGPS mode into position relative to the local reference receiver 120. This way the PVT results generated by the user computer system 144 will seamlessly transition between the two different modes of operation.

When the RTK corrections are available again, the user resumes RTK operation in step 460, which is similar to the RTK operation in step 440.

Figure 5:
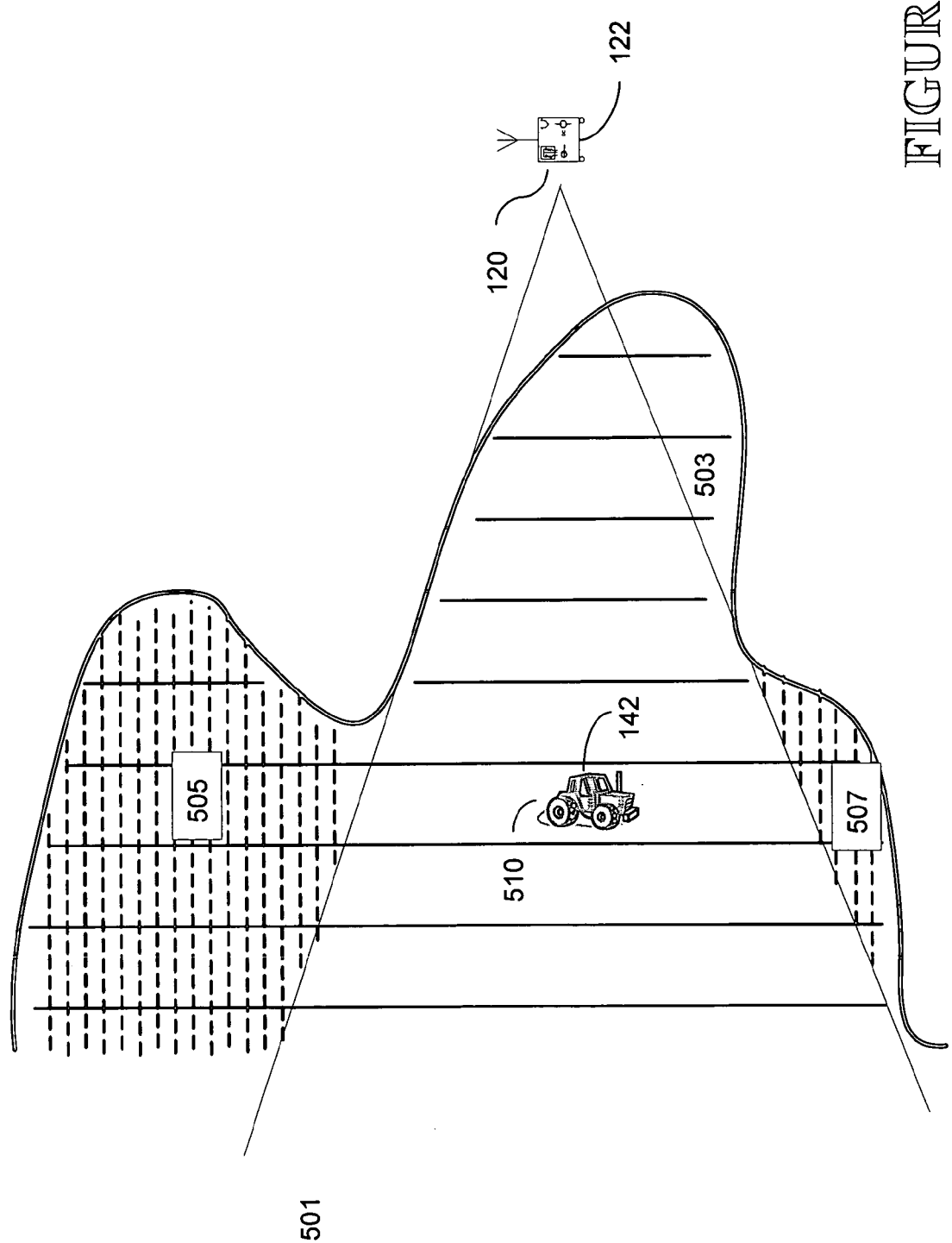
FIG. 5 is a diagram illustrating a situation in which the combined operation can be used.

Process 400 can be used in many applications. One application involves an extension of an RTK operation into areas where the RTK radio link cannot be maintained, but where the WADGPS communication link is at least generally available. For example, as shown in FIG. 5, the user or object 140 may be a farming vehicle 510 moving in rows 520 in an area 501 of rolling hills, with the user receiver 142 attached to the farming vehicle or to a farming equipment that is connected to the farming vehicle. The area 501 includes area 503 that is visible from the reference station 120 in the local RTK system 150 and areas (shaded) 505 and 507 that are not visible from the reference station 120. Because the RTK communication link is usually line of site, the RTK data would be lost whenever the user GPS receiver 142 is moved from area 503 to area 505 or 507. But the data link between the user receiver 142 and the WADGPS system 100 is generally available because it is often facilitated by satellites. By initializing the floating ambiguities in the WADGPS system 100 whenever the RTK radio link is available and the RTK system 150 is operational, the accuracy of the RTK operation can be practically preserved during those intervals when the RTK link is lost.

Figure 6:
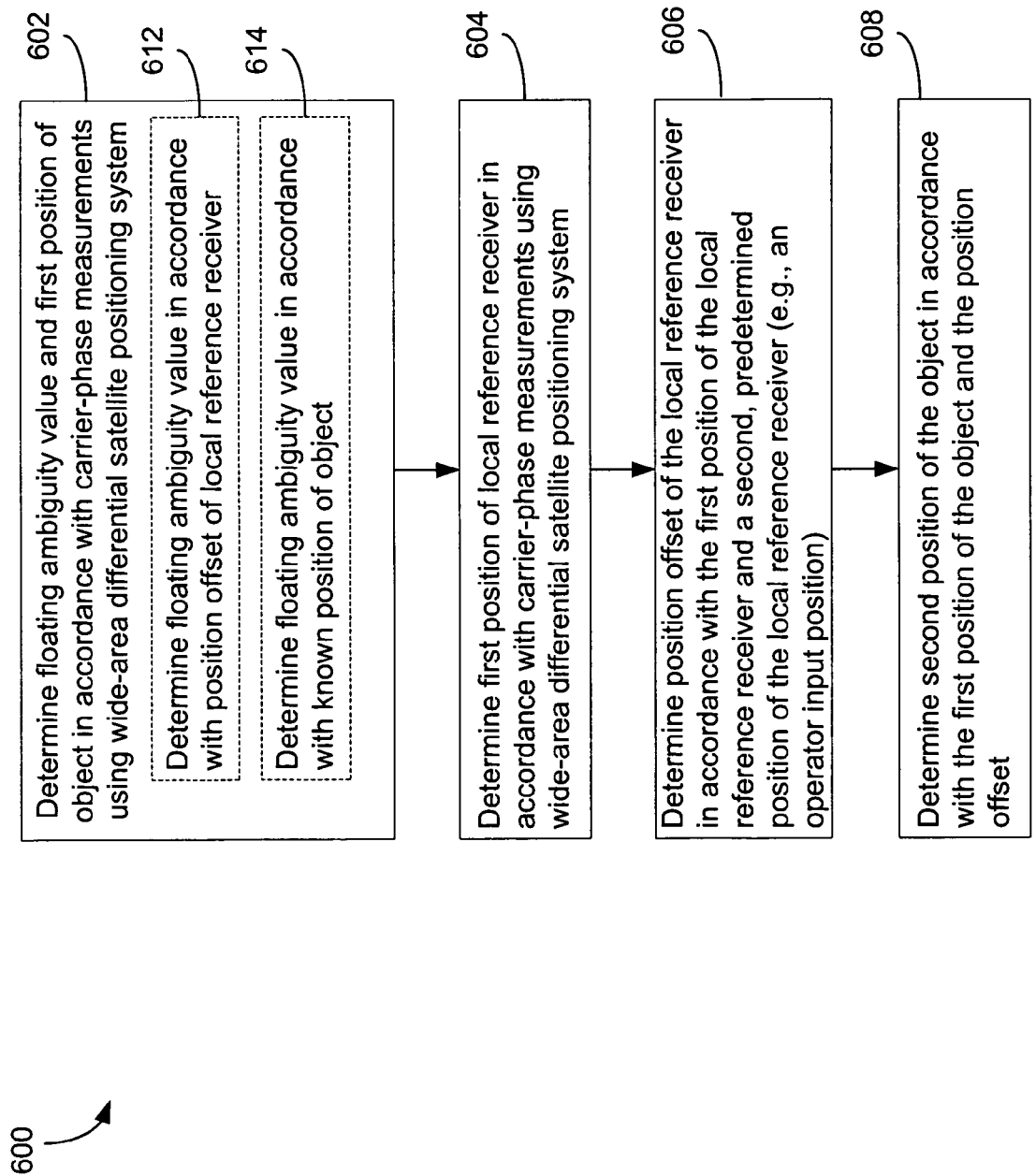
FIG. 6 is a flowchart illustrating a process flow for combined operation using both the WADGPS system and the local RTK system.

FIG. 6 shows a process 600 for positioning or navigating an object associated with both a local reference receiver and a wide-area differential satellite positioning system (e.g., WADGPS). A floating ambiguity value and a first position of the object are determined in accordance with carrier-phase measurements using the wide-area differential satellite positioning system (602). In addition, a first position of the local reference receiver is determined in accordance with carrier-phase measurements using the wide-area differential satellite positioning system (604). Then, a position offset of the local reference receiver is determined in accordance with the first position of the local reference receiver and a second position of the local reference receiver (606). In some embodiments, the second position of the local reference receiver is pre-determined, e.g., provided by operator input to the local reference receiver. As a result, a second position of the object is determined in accordance with the first position of the object and the position offset (608). In some embodiments, the floating ambiguity value is initialized at 602 in accordance with the aforementioned position offset of the local reference receiver (612), while in some other embodiments it is initialized using a known position of the object input by a user (614).

While the WADGPS system 100 in FIG. 1 has been used in the above description, it will be appreciated that any regional, wide area, or global system which makes use of carrier-phase measurements from satellites for positioning and/or navigation purposes and thus requires determining ambiguity values associated with the phase measurements can also benefit by the method 300 described above. Examples of these systems include the Starfire™ System developed by John Deere Company, and the regional High Accuracy-National Differential (HA-ND) GPS system being developed by several U.S. government agencies.

What is claimed is:

1. A method for positioning or navigating an object associated with both a local reference receiver and a wide-area differential satellite positioning system, comprising:
   determining a floating ambiguity value and a first position of the object in accordance with carrier-phase measurements using the wide-area differential satellite positioning system;
   determining a first position of the local reference receiver in accordance with carrier-phase measurements using the wide-area differential satellite positioning system;
   determining a position offset of the local reference receiver in accordance with the first position of the local reference receiver and a second position of the local reference receiver, wherein the second position of the local reference receiver is pre-determined; and
   determining a second position of the object in accordance with the first position of the object and the position offset.

2. The method of claim 1, further comprising initializing the floating ambiguity value in accordance with the position offset of the local reference receiver.

3. The method of claim 1, wherein a known position of the object input by a user is used to initialize the floating ambiguity value.

4. A method for positioning or navigating an object associated with both a local reference receiver and a wide-area differential satellite positioning system, comprising:
   determining a floating ambiguity value and a first position of the object in accordance with carrier-phase measurements using the wide-area differential satellite positioning system in a first mode of operation; and
   determining a second position of the object in accordance with information received from the local reference receiver using real-time kinematic positioning in a second mode of operation.

5. The method of claim 4, wherein a known position of the object is used to initialize the floating ambiguity value.

6. The method of claim 5, wherein the known position of the object is the second position.

7. The method of claim 5, wherein the known position of the object is input by a user.

8. The method of claim 4, wherein the second mode of operation is used if communication with the local reference receiver is available.

9. The method of claim 4, wherein the first mode of operation is used when communication with the local reference receiver is lost and the second mode of operation is used when the communication with the local reference receiver is available again, and wherein the first position and an offset between the first position and the second position are used to initialize the second position when switching from the first mode of operation to the second mode of operation.

10. The method of claim 4, wherein the second mode of operation is used if a distance from the local reference receiver to the object is less than a pre-determined value.

11. The method of claim 4, wherein the first mode of operation is used if communication with the local reference receiver is lost.

12. The method of claim 4, wherein the first and second modes of operation are used substantially simultaneously, and a difference between the second position and the first position is used to initialize the floating ambiguity value.

13. A computer readable medium storing therein computer readable program instructions that, when executed by a processor, cause the processor to perform a method for positioning or navigating an object associated with both a local reference receiver and a wide-area differential satellite positioning system, the program instructions comprising:
   instructions for determining a floating ambiguity value and a first position of the object in accordance with carrier-phase measurements using the wide-area differential satellite positioning system;
   instructions for determining a first position of the local reference receiver in accordance with carrier-phase measurements using the wide-area differential satellite positioning system;
   instructions for determining a position offset of the local reference receiver in accordance with the first position of the local reference receiver and a second position of the local reference receiver, wherein the second position of the local reference receiver is pre-determined; and
   instructions for determining a second position of the object in accordance with the first position of the object and the position offset.

14. A computer readable medium storing therein computer readable program instructions that, when executed by a processor, cause the processor to perform a method for positioning or navigating an object associated with both a local reference receiver and a wide-area differential satellite positioning system, the program instructions comprising:
   instructions for determining a floating ambiguity value and a first position of the object in accordance with carrier-phase measurements using the wide-area differential satellite positioning system in a first mode of operation; and
   instructions for determining a second position of the object in accordance with information received from the local reference receiver using real-time kinematic positioning in a second mode of operation.

15. A satellite navigation receiver configured to operate in a first mode and a second mode of operation, wherein in the first mode of operation a floating ambiguity value and a first position of an object are determined in accordance with carrier-phase measurements using a wide-area differential satellite positioning system, and wherein in the second mode of operation a second position of the object is determined in accordance with information received from a local reference receiver using real-time kinematic positioning.

16. A satellite navigation receiver, comprising:
   a memory;
   a processor; and
   a program, stored in the memory and executed by the processor, the program including:
      instructions for determining a floating ambiguity value and a first position of an object in accordance with carrier-phase measurements using a wide-area differential satellite positioning system;

instructions for determining a first position of a local reference receiver in accordance with carrier-phase measurements using the wide-area differential satellite positioning system;

instructions for determining a position offset of the local reference receiver in accordance with the first position of the local reference receiver and a second position of the local reference receiver, wherein the second position of the local reference receiver is pre-determined; and instructions for determining a second position of the object in accordance with the first position of the object and the position offset.

17. A satellite navigation receiver, comprising an integrated circuit configured to perform:

operations for determining a floating ambiguity value and a first position of an object in accordance with carrier-phase measurements using a wide-area differential satellite positioning system;

operations for determining a first position of a local reference receiver in accordance with carrier-phase measurements using the wide-area differential satellite positioning system;

operations for determining a position offset of the local reference receiver in accordance with the first position of the local reference receiver and a second position of the local reference receiver, wherein the second position of the local reference receiver is pre-determined; and operations for determining a second position of the object in accordance with the first position of the object and the position offset.

18. A satellite navigation receiver, comprising:

a memory means;

a processor means; and a program means, stored in the memory means and executed by the processor means, for positioning or navigating an object, the program means including:

instructions for determining a floating ambiguity value and a first position of an object in accordance with carrier-phase measurements using a wide-area differential satellite positioning system;

instructions for determining a first position of a local reference receiver in accordance with carrier-phase measurements using the wide-area differential satellite positioning system;

instructions for determining a position offset of the local reference receiver in accordance with the first position of the local reference receiver and a second position of the local reference receiver, wherein the second position of the local reference receiver is pre-determined; and instructions for determining a second position of the object in accordance with the first position of the object and the position offset.

* * * * *